3,052,598
SOIL FUMIGANT
David W. Racusen and Marvin Legator, Modesto, Calif., assignors to Shell Oil Company, a corporation of Delaware
No Drawing. Filed Apr. 19, 1960, Ser. No. 23,148
8 Claims. (Cl. 167—39)

This invention relates to an improved method of soil fumigation and more specifically to an improved method of killing phytopathogenic organisms present in the soil by contacting said organisms with a novel fumigant consisting essentially of acrolein and sawdust. In the past a wide variety of materials have been employed for combatting soil inhabiting phytopathogenic organisms such as nematodes, fungi and bacteria. One effective method of combatting such organisms has been to apply toxic quantities of acrolein to the soil. Once applied the acrolein tends to vaporize thus effectively killing a large proportion of the damaging organisms. However, this vaporization substantially reduced the longevity of acrolein toxicity thus creating a most serious disadvantage to its general use as a soil fumigant. Accordingly great effort has been directed toward finding a soil fumigant composition which is equivalent to acrolein in toxicity yet superior to acrolein in the extended period of its toxicity while in the soil. The present invention is particularly concerned with and takes as its prime object the provision of a soil fumigant composition which fulfills these requirements. Another object of this invention is to provide a soil fumigant composition which may be manufactured economically and easily. Yet another object of this invention is to provide a novel method of controlling soil inhabiting phytopathogenic organisms. Other objects, features and advantages of the present invention will be apparent from the following specification read in conjunction with the appended claims.

It has now been discovered that mixtures of acrolein and cellulose containing material such as wood chips or sawdust manifest a toxicity to soil inhabiting phytopathogenic organisms significantly longer than that of acrolein alone. It is believed that the resulting mixtures of soil, cellulose-containing material and acrolein are novel mixtures of improved utility because of their freedom from phytopathogenic organisms.

While it is not intended that the invention be limited to theoretical considerations it is speculated that the extended toxicity of the compositions of the present invention may be due to the slow release of acrolein in the soil. In other words it is believed that the acrolein may be loosely held by the sawdust either physically or chemically. Another theory is that it is not the acrolein itself which manifests toxicity but rather the reaction product or products of the acrolein with one or more chemical constituents of the wood. Thus the active compound of the present compositions may be the reaction products of acrolein with phenols, lignin, or cellulosic materials.

The compositions of the present invention may be made conveniently by several methods. For example, wet or dry sawdust may be incubated with acrolein at room temperature. It is also possible to extract the sawdust with acrolein as in a Soxhlet apparatus or to extract the sawdust with water and subsequently treat the water extract with acrolein.

In the simple incubation method, wet or dry sawdust is allowed to incubate with acrolein in a closed container at room temperature. At the end of the incubation period the excess acrolein and water are removed by aeration. In one experiment, employing the incubation method, 140 grams of coarse-meshed sawdust, made from mixed woods, including redwoods and pine, was treated with 14 milliliters of acrolein and 56 milliliters of water in a closed jar. The contents were thoroughly mixed by shaking and then allowed to incubate at room temperature for 24 hours. The jar was then opened and the contents air dried.

Chemical assay: 1 milliliter acrolein per 100 grams of sawdust
Bioassay: 1 milliliter acrolein per 100 grams of sawdust In another experiment 240 grams of coarse-meshed sawdust, made from mixed woods including redwood and white pine, was mixed with 340 milliliters of water and 80 milliliters of acrolein in a stoppered two-liter flask. The flask was then allowed to stand at room temperature for five days at which time the contents were air dried.

Chemical assay: 9.5 milliliters acrolein per 100 grams sawdust
Bioassay: 8.7 milliliters acrolein per 100 grams sawdust In a third experiment 10 grams of 35-mesh sawdust, made from mixed woods including redwood and white pine, was incubated with 1 milliliter of acrolein alone and in the presence of A. 15 milliliters water
B. 14 milliliters water plus 1 milliliter one normal NaOH
C. 15 milliliters water plus 0.1 milliliter glacial acetic acid The mixtures were shaken in stoppered 125 milliliter flasks and allowed to stand for 19 hours at room temperature. The mixtures were then air-dried.

Bioassay:
    Control—0.4% acrolein (by weight)
    A—0.9% acrolein (by weight)
    B—less than 0.2% acrolein (by weight)
    C—0.25% acrolein (by weight)

In yet another experiment 2400 grams of coarse-meshed sawdust made from mixed woods including redwood and white pine was mixed with 3800 milliliters of water and 800 milliliters of acrolein in a sealed can. The can was allowed to stand at room temperature for 12 days at which time the contents were air-dried.

Bioassay: more than 10 milliliters acrolein per 100 grams sawdust
Chemical assay: 14.5 milliliters acrolein per 100 grams sawdust The following amounts of sawdust, acrolein and water were incubated for two days in stoppered 125 milliliter flasks at room temperature.

|  | A | B | C |
|---|---|---|---|
| Sawdust, grams | 4 | 1 | 10 |
| Acrolein, grams | 1 | 10 | 1 |
| Water, grams | 6 | 1.5 | 15 |
| Contents were air-dried in a hood: |  |  |  |
| Bioassay, percent | 2 | 10 | 1 |
| Chemical assay, percent | 2.9 | 12-16 | 1.2 |

The following experiments illustrate preparations of novel compounds of the present invention employing Soxhlet apparatus extraction. In one experiment 5 grams of 35 mesh sawdust made from mixed woods including redwood and pine was Soxhlet extracted with 100 milliliters of acrolein for 4.5 hours. The brown solution was evaporated to a syrup in vacuo, transferred to a watch glass and air-dried for 3 days. After a final drying over solid NaOH the glassy material weighed 3.55 grams. A suitable formulation for bio- and chemical assay was a 10% solution in 50% isopropanol water.

Bioassay: 45% acrolein (by weight)
Chemical assay: 35% acrolein (by weight)

In another experiment 10 grams of 35 mesh sawdust made from mixed woods including redwood and pine was extracted with water in a Soxhlet extractor. The brown water extract was saved and the sawdust re-extracted with fresh water. The operation was repeated until four fractions were obtained. One milliliter of fresh distilled acrolein was added to each aqueous fraction in a stoppered flask. After 24 hours, the treated extracts were evaporated to dryness. The following amounts of residue were obtained.

Fraction 1—900 milligrams black "tar"
Fraction 2—113 milligrams brown "tar"
Fraction 3—214 milligrams light yellow "tar"
Fraction 4—195 milligrams light yellow "tar"

These residues were made into 1% water solutions. Assay of the water solutions revealed the following amounts of acrolein in the dry residues.

|  | Biological, percent | Chemical, percent |
| --- | --- | --- |
| Fraction 1 | 10 | 16 |
| Fraction 2 | 50 | 43 |
| Fraction 3 | 50 | 55 |
| Fraction 4 | 50 | 60 |

In yet another experiment one gram of finely-powered redwood bark pulp was mixed with 1 milliliter of water and 2 milliliters of acrolein in a stoppered test tube. The mixture was allowed to stand for 4 days at room temperature and air-dried.

Bioassay: 18% acrolein (by weight)
Chemical assay: 12% acrolein (by weight)

In still another experiment sticks of wood (1 x 1 x 10 centimeters) were incubated in stoppered test tubes for 2 day at room temperature with 10 milliliters acrolein. The residual acrolein was discarded. The sticks were air-dried for 4 days, and ground to a fine sawdust through a 40 mesh screen in a Wiley mill. After further drying the ground samples for 24 hours, they were assayed.

|  | Redwood, percent | White Pine, percent |
| --- | --- | --- |
| Bioassay | 2 | 1 |
| Chemical assay | 2.6 | 2.7 |

It is to be understood that the assay methods, both biological and chemical are not necessarily specific for acrolein, but may include similar materials or reaction products.

Though the temperature employed in preparing the acrolein-sawdust compositions of the present invention may vary considerably it has been found preferable to mix the components at room temperature. Similarly it is preferred that a neutral pH be maintained since higher and lower pH values result in somewhat lessened activity. The incubation period may vary from 1 to more than 30 days. Generally speaking, superior results are obtained with longer incubation periods such as for example, 30 days.

Generally speaking the ratio of sawdust to acrolein may vary between 1:10 and 10:1 by weight/unit volume with a constant ratio of sawdust to water of about 1:1.5 being maintained. A ratio of sawdust to acrolein of 10:1 to 3:1 by weight/unit volume is preferred.

The novel compositions of the present invention may be employed to control soil borne fungal and bacterial diseases and to control weed seed germination in soil. All of the acrolein compositions were quantitatively bio- assayed by using the saprophytic gram negative bacteria, *Pseudomonas aeruginosa*, or the plant parasitic fungus, *Rhizoctonia solani* as the assay organisms. The compositions in varying concentrations were added to 5 milliliters of a standard culture medium. The assay organism was then added to the sterile broth and incubated for a sufficient period of time to obtain optimum growth in the controls containing no adduct. In the case of *Pseudomonas aeruginosa* a 16 hours incubation period at 37° C. was employed. After this period, the growth of the organism was determined turbidimetrically using a Coleman Junior Spectrophotometer at 520 millimicrons. A standard curve was then plotted using acrolein and the concentration of the composition was determined in terms of acrolein equivalent from the standard curve. When *Rhizoctonia solani* was employed as an assay organism a 72 hour incubation period was employed, and growth was determined by visual inspection.

In another test sugar beets were planted in naturally infested soil in glass tubes which measured 25 millimeters in diameter and 200 millimeters in length. The soil was naturally infested with seedling blight organisms, mainly belonging to the genus Pythium. In order for sugar beets to grow in this soil a fungicide must be added to control the pathogens. To determine the activity of the compositions of the present invention, each was mixed with the first four inches of soil in the tube which was then seeded with sugar beets. After 6–8 days' growth of the sugar beets, failure due to the fungus attack or phytotoxicity was determined. The following results were obtained.

| Concentration of compound, milligrams | Acrolein-sawdust (1% equivalent) |
| --- | --- |
| 40 | Disease control, no phytotoxicity. |
| 80 | Do. |
| 160 | Do. |

The following experiment was carried out to determine the release of acrolein from sawdust.

Varying amounts of acrolein-treated sawdust in 5 milliliters of water were placed in pint Mason jars. This material was previously assayed by chemical and biological methods and showed the equivalents of 10% acrolein. The bottom portion of a petri plate containing V–8 agar and inoculated with *Rhizoctonia solani* was inverted over the top of each jar thus effecting a seal. After three days incubation at room temperature, the petri plate bottoms were removed and growth was determined by visual inspection. The following results were obtained.

| Milligrams of acrolein equivalent in sawdust | Milligrams of acrolein saturated |
| --- | --- |
| 0=growth<br>0.2=growth<br>0.5=growth<br>1.0=inhibition | 0.10=growth<br>0.25=inhibition |

Thus in a three day period, about one-fourth the amount of acrolein was released from sawdust as compared to equivalent amount of pure acrolein. Because of this slow release of acrolein, control of deleterious fungus and nematodes in the soil may be maintained for a period much longer than through the employment of acrolein alone.

Yet in spite of the slow release of acrolein, the sawdust-acrolein compositions of the present invention show action substantially equivalent to acrolein alone in tests conducted on twenty-two greenhouse flats (10 inches x 15 inches x 4 inches) filled with Keyes sandy loam infested with soil borne fungi. The flats were treated as follows:

Eight flats were drenched with acrolein at four rates with two replications. The measured amount of material was diluted with water to 100 milliliters per square foot of soil surface. The acrolein adduct of equivalent rates of active acrolein was weighed out in grams and then evenly distributed over the soil surface of eight prepared flats. The material was then worked into the upper two inches of soil. This was followed by a clear water drench of 1000 milliliters per square foot of soil surface. For controls, three flats of soil were left untreated and three flats were steam sterilized.

Ten days following the above applications each flat was seeded with 5 pinto bean and 20 sugar beet seeds as indicators for disease control. Counts were made of germination of sugar beet seeds to determine the degree of damping off.

One month after seeding the bean plants were removed, roots washed and indexed for disease control. The disease present was due to *Rhizoctonia solani* and *Thielaviopsis basicola*. The results of this test are shown in the following tables:

*Sugar Beets (Average 2 Replications)*

| Rates applied per square foot | | Percent germination | | Percent damping-off | |
|---|---|---|---|---|---|
| Acrolein | Adduct | Acrolein | Adduct | Acrolein | Adduct |
| 2 mls | 13.8 gms | 90.0 | 85.0 | 0.0 | 0.0 |
| 4 mls | 27.6 gms | 100.0 | 97.5 | 0.0 | 0.0 |
| 6 mls | 41.4 gms | 90.0 | 85.0 | 0.0 | 0.0 |
| 8 mls | 55.2 gms | 80.0 | 70.0 | 0.0 | 0.0 |
| Sterilized control | | 100.0 | | 0.0 | |
| Unsterilized control | | 70.0 | | 47.0 | |

*Pinto Beans (Average 2 Replications)*

| Rates applied per square foot | | Disease readings [1][2] | | Phytotoxicity | |
|---|---|---|---|---|---|
| Acrolein | Adduct | Acrolein | Adduct | Acrolein | Adduct |
| 2 mls | 13.8 gms | 12.5 | 25.0 | None | None. |
| 4 mls | 27.6 gms | 5.0 | 12.5 | do | Slight. |
| 6 mls | 41.4 gms | 0.0 | 5.0 | do | Moderate. |
| 8 mls | 55.2 gms | 0.0 | 0.0 | Slight | |
| Sterilized control | | 0.0 | | | |
| Unsterilized control | | 72.5 | | | |

[1] Root rot caused by *Thielaviopsis basicola* and *Rhizoctonia solani*.
[2] 0=no disease; 75-100=maximum disease.

Thus the acrolein-sawdust compositions of the present invention maintain their soil-fumigant properties for a period significantly in excess of that of acrolein alone yet are in general biotoxicity equivalent to acrolein. Another significant advantage of the compositions of the present invention as compared to the more volatile acrolein alone is the ease with which they may be handled.

This application is a continuation-in-part of our copending application Serial Number 705,506, filed December 27, 1957, now abandoned.

We claim as our invention:

1. As a novel composition of matter, a soil fumigant composition comprising the water extract of wood and acrolein, said extract prepared by treating wood with water to produce a water extract and treating said water extract with acrolein, the ratio of said wood to said acrolein ranging between approximately 1:10 and 10:1 by weight per unit volume.

2. As a novel composition of matter, a soil fumigant composition comprising the acrolein extract of wood, said extract prepared by treating wood with acrolein and separating said extract from said wood, the ratio of said wood to said acrolein ranging between approximately 1:10 and 10:1 by weight per unit volume.

3. The method of treating soil inhabited with phytopathogenic organisms which comprises introducing into said soil a composition comprising the water extract of wood and acrolein in an amount toxic to said organisms, said extract prepared by treating wood with water to produce a water extract and treating said water extract with acrolein, the ratio of said wood to said acrolein ranging between approximately 1:10 and 10:1 by weight per unit volume.

4. The method of treating soil inhabited with phytopathogenic organisms which comprises introducing into said soil a composition comprising the acrolein extract of wood in an amount toxic to said organisms, said extract prepared by treating wood with acrolein and separating said extract from said wood, the ratio of said wood to said acrolein ranging between approximately 1:10 and 10:1 by weight per unit volume.

5. As a novel composition of matter, a soil fumigant composition comprising the reaction product of acrolein and wood, said reaction product resulting from incubation of a mixture of wood and acrolein, the ratio of wood to acrolein in said mixture initially ranging between approximately 1:10 and 10:1 by weight per unit volume.

6. As a novel composition of matter, a soil fumigant composition comprising the reaction product of acrolein and wood, in particulate form, in the presence of water, said reaction product resulting from incubation of a mixture of wood and acrolein, the ratio of wood to acrolein in said mixture initially ranging between approximately 1:10 and 10:1 by weight per unit volume, the ratio of wood to water being constant at about 1:15 by weight per unit volume.

7. The method of treating soil inhabited with phytopathogenic organisms which comprises introducing into said soil a composition comprising the reaction product of acrolein and wood, said reaction product resulting from incubation of a mixture of wood and acrolein, the ratio of wood to acrolein in said mixture initially ranging between approximately 1:10 and 10:1 by weight per unit volume.

8. The method of treating soil inhabited with phytopathogenic organisms which comprises introducing into said soil a composition comprising the reaction product of acrolein and wood, in particulate form, in the presence of water, said reaction product resulting from incubation of a mixture of wood and acrolein, the ratio of wood to acrolein in said mixture initially ranging between 1:10 and 10:1 by weight per unit volume the ratio of wood to water being constant at about 1:1.5 by weight per unit volume.

References Cited in the file of this patent

UNITED STATES PATENTS

| | | |
|---|---|---|
| 2,191,421 | Boyce | Feb. 20, 1940 |
| 2,210,945 | Mills | Aug. 13, 1940 |
| 2,376,327 | Chuck | May 22, 1945 |
| 2,555,796 | Krause | June 5, 1951 |